(12) United States Patent
Sheridan

(10) Patent No.: US 11,162,430 B2
(45) Date of Patent: Nov. 2, 2021

(54) GEARED GAS TURBINE ENGINE

(71) Applicant: Raytheon Technologies Corporation, Farmington, CT (US)

(72) Inventor: William G. Sheridan, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/889,942

(22) Filed: Jun. 2, 2020

(65) Prior Publication Data

US 2020/0362765 A1    Nov. 19, 2020

Related U.S. Application Data

(62) Division of application No. 15/206,434, filed on Jul. 11, 2016, now Pat. No. 10,669,947.

(51) Int. Cl.
  *F16H 1/28*     (2006.01)
  *F02C 7/36*     (2006.01)
  *F02K 3/06*     (2006.01)

(52) U.S. Cl.
  CPC .................. *F02C 7/36* (2013.01); *F02K 3/06* (2013.01); *F05D 2220/36* (2013.01); *F05D 2260/40311* (2013.01); *F16H 1/28* (2013.01); *F16H 2001/2872* (2013.01); *F16H 2001/2881* (2013.01)

(58) Field of Classification Search
  CPC ............... F16H 1/28; F16H 2001/2872; F16H 2001/2881; F02C 7/36; F05D 2260/40311
  See application file for complete search history.

(56) References Cited

U.S. PATENT DOCUMENTS

| | | |
|---|---|---|
| 4,251,987 A | 2/1981 | Adamson |
| 5,010,729 A | 4/1991 | Adamson et al. |
| 6,033,336 A | 3/2000 | Bae |
| 6,381,948 B1 | 5/2002 | Klingels |
| 6,763,654 B2 | 7/2004 | Orlando et al. |
| 7,083,538 B2 | 8/2006 | Szalony |

(Continued)

FOREIGN PATENT DOCUMENTS

WO    2015031143    3/2015

OTHER PUBLICATIONS

European Search Report for European Patent Application No. 17180462.8 dated Nov. 14, 2017.

*Primary Examiner* — Erin D Bishop
(74) *Attorney, Agent, or Firm* — Carlson, Gaskey & Olds, P.C.

(57) ABSTRACT

A speed change device includes a sun gear. A plurality of intermediate gears surround the sun gear. Each of the plurality of intermediate gears includes a forward set of teeth and an aft set of teeth. A ring gear surrounds the plurality of intermediate gears. The ring gear includes a forward portion with a forward set of teeth in meshing engagement with the forward set of teeth on each of the plurality of intermediate gears and an aft portion with an aft set of teeth in meshing engagement with the aft set of teeth on each of the plurality of intermediate gears. A carrier includes a carrier forward portion and a carrier aft portion. Each of the plurality of intermediate gears are located axially between the carrier forward portion and the carrier aft portion.

15 Claims, 2 Drawing Sheets

(56) References Cited

U.S. PATENT DOCUMENTS

| | | | |
|---|---|---|---|
| 7,487,630 B2 * | 2/2009 | Weiler | F02K 3/072 |
| | | | 60/226.1 |
| 7,716,914 B2 | 5/2010 | Schilling | |
| 7,765,786 B2 | 8/2010 | Klingels et al. | |
| 7,882,693 B2 | 2/2011 | Schilling | |
| 8,517,672 B2 | 8/2013 | McCooey | |
| 8,899,915 B2 | 12/2014 | McCune et al. | |
| 10,041,498 B2 | 8/2018 | Otto | |
| 2003/0200741 A1 | 10/2003 | Moniz et al. | |
| 2005/0198941 A1 | 9/2005 | Bart et al. | |
| 2006/0236675 A1 | 10/2006 | Weiler | |
| 2013/0259652 A1 | 10/2013 | Kupratis et al. | |
| 2016/0195096 A1 | 7/2016 | Otto et al. | |

* cited by examiner

GEARED GAS TURBINE ENGINE

CROSS-REFERENCE TO RELATED APPLICATIONS

This disclosure is a divisional of U.S. patent application Ser. No. 15/206,434 filed Jul. 11, 2016.

BACKGROUND

A gas turbine engine may include a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. Among other variations, the compressor section can include low and high pressure compressors, and the turbine section can include low and high pressure turbines.

Typically, a high pressure turbine drives a high pressure compressor through an outer shaft to form a high spool, and a low pressure turbine drives a low pressure compressor through an inner shaft to form a low spool. The fan section may also be driven by the inner shaft. A direct drive gas turbine engine may include a fan section driven by the low spool such that a low pressure compressor, low pressure turbine, and fan section rotate at a common speed in a common direction.

A speed reduction device, which may be a fan drive gear system or other mechanism, may be utilized to drive the fan section such that the fan section may rotate at a speed different than the turbine section. This allows for an overall increase in propulsive efficiency of the engine. In such engine architectures, a shaft driven by one of the turbine sections provides an input to the speed reduction device that drives the fan section at a reduced speed such that both the turbine section and the fan section can rotate at closer to optimal speeds.

Although gas turbine engines utilizing speed change mechanisms are generally known to be capable of improved propulsive efficiency relative to conventional engines, gas turbine engine manufacturers continue to seek further improvements to engine performance including improvements to thermal, transfer and propulsive efficiencies.

SUMMARY

In one exemplary embodiment, a gas turbine engine includes a fan section that includes a fan rotatable about an engine axis. A compressor section includes a low pressure compressor rotatable about the engine axis. A turbine section includes a fan drive turbine for driving the fan and the low pressure compressor. A speed reduction device connects the fan drive turbine to the fan and the low pressure compressor. The speed reduction device includes a sun gear driven by an inner shaft. A plurality of intermediate gears surround the sun gear. A carrier supports the plurality of intermediate gears for driving the low pressure compressor. A ring gear is located radially outward from the intermediate gears and includes a forward portion for driving a fan drive shaft and an aft portion.

In a further embodiment of any of the above, the carrier includes an axially forward portion and an axially aft portion. The plurality of intermediate gears are located axially between the axially forward portion and the axially aft portion of the carrier.

In a further embodiment of any of the above, the axially aft portion of the carrier is connected to the low pressure compressor.

In a further embodiment of any of the above, the fan drive turbine is configured to rotate at a first rotational speed. The low pressure compressor is configured to rotate at a second rotational speed. The fan is configured to rotate at a third rotational speed.

In a further embodiment of any of the above, the first rotational speed is greater than the second rotation speed and the third rotational speed is less than the second rotational speed.

In a further embodiment of any of the above, the speed reduction device includes a first gear ratio for driving the low pressure compressor and a second gear ratio for driving the fan.

In a further embodiment of any of the above, the first gear ratio is between about 2:1 and about 5:1 and the second gear ratio is between about 3:1 and about 5:1.

In a further embodiment of any of the above, the forward portion of the ring gear moves independently of the aft portion of the ring gear. The aft portion of the ring gear is fixed relative to an engine static structure.

In a further embodiment of any of the above, the fan drive turbine and the low pressure compressor rotate in a first rotational direction and the fan rotates in a second opposite rotational direction.

In a further embodiment of any of the above, the plurality of intermediate gears include a forward set of teeth and an aft set of teeth. The forward set of teeth are in meshing engagement with the forward portion of the ring gear. The aft set of teeth are in meshing engagement with the aft portion of the ring gear.

In a further embodiment of any of the above, the forward set of teeth on the plurality of intermediate gears include a first number of teeth and the aft set of teeth on the plurality of intermediate gears include a second number of teeth. The first number of teeth is different from the second number of teeth.

In a further embodiment of any of the above, the forward set of teeth on the plurality of intermediate gears are fixed relative to the aft set of teeth on the plurality of intermediate gears.

In another exemplary embodiment, a speed change device includes a sun gear. A plurality of intermediate gears surround the sun gear. Each of the plurality of intermediate gears includes a forward set of teeth and an aft set of teeth. A ring gear surrounds the plurality of intermediate gears. The ring gear includes a forward portion with a forward set of teeth in meshing engagement with the forward set of teeth on each of the plurality of intermediate gears. An aft portion with an aft set of teeth in meshing engagement with the aft set of teeth on each of the plurality of intermediate gears. A carrier includes a carrier forward portion and a carrier aft portion. Each of the plurality of intermediate gears are located axially between the carrier forward portion and the carrier aft portion.

In a further embodiment of any of the above, the forward portion of the ring gear is attached to a fan drive shaft.

In a further embodiment of any of the above, the aft set of teeth on each of the plurality of intermediate gears are in meshing engagement with teeth the sun gear.

In a further embodiment of any of the above, the carrier aft portion includes a mechanical connection for drive a low pressure compressor.

In a further embodiment of any of the above, each of the plurality of intermediate gears are supported by at least one bearing that is attached to a shaft. The shaft is supported by the carrier forward portion and the axially aft portion. The plurality of intermediate gears are located between the axially forward portion and the axially aft portion of the carrier.

In another exemplary embodiment, a method of operating a gas turbine engine includes the steps of rotating a fan drive turbine at a first rotational speed to drive a speed change device. The fan drive turbine drives a sun gear in the speed change device. A low pressure compressor is rotated at a second rotational speed. The low pressure compressor is driven by a carrier of the speed change device and the second rotational speed is less than the first rotational speed. A fan is rotated at a third rotational speed. The fan is driven by a ring gear of the speed change device and the third rotational speed is less than the second rotational speed.

In a further embodiment of any of the above, the fan drive turbine and the low pressure compressor rotate in a first rotational direction. The fan rotates in a second rotational direction opposite the first rotational direction.

In a further embodiment of any of the above, the speed change device includes a plurality of intermediate gears having a forward set of teeth and an aft set of teeth. The forward set of teeth are in meshing engagement with the ring gear for driving the fan. The aft set of teeth are in meshing engagement with the sun gear.

DETAILED DESCRIPTION

Figure 1:
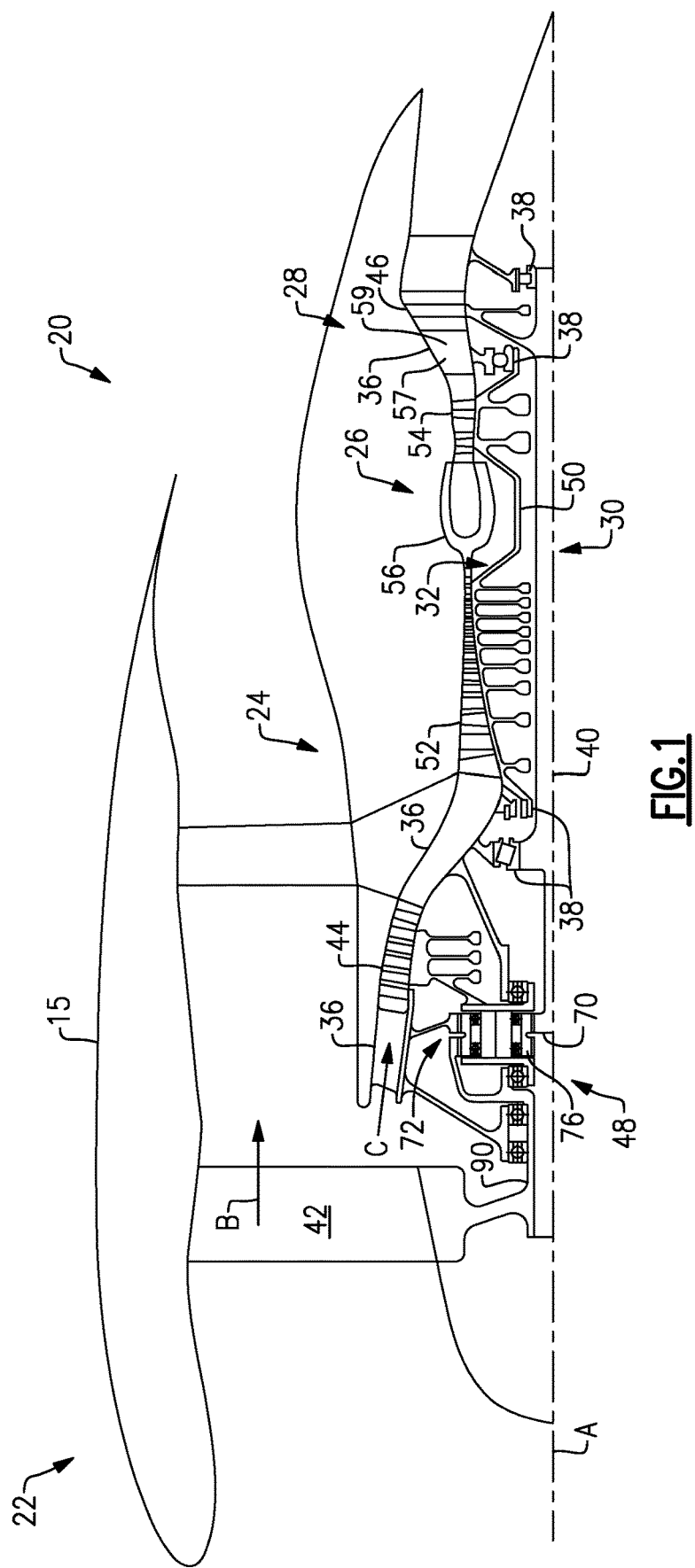
FIG. 1 is a schematic view of an example gas turbine engine according to a first non-limiting embodiment.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects with a fan 42, a first (or low) pressure compressor 44, and a first (or low) pressure turbine 46. In one example embodiment, the low pressure compressor 44 includes only three stages and the low pressure turbine includes one or two stages. The inner shaft 40 is connected to the fan 42 and the low pressure compressor 44 through a speed change mechanism, which in exemplary gas turbine engine 20 is illustrated as a geared architecture 48, to drive the fan 42 and the low pressure compressor 44 at a lower rotational speed than the low speed spool 30. In an example embodiment, the low speed spool 30 rotates at a first rotational speed, the low pressure compressor 44 rotates at a second rotational speed, and the fan 42 rotates at a third rotational speed. Moreover, the first rotational speed of the low speed spool 30 is greater than the second rotational speed of the low pressure compressor 44 and the second rotational speed of the low pressure compressor 44 is greater than the third rotational speed of the fan 42.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core flow path is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example non-limiting embodiment, the engine 20 bypass ratio is greater than about six (6), with an example embodiment being greater than about ten (10) and a further example embodiment greater than about fifteen (15). The geared architecture 48 is an epicyclic gear train or other gear system, with a gear reduction ratio of between about 2:1 and about 5:1 between the low pressure turbine 46 and the low pressure compressor 44 and a gear ratio of about 3:1 to about 5:1 between the low pressure compressor 44 and the fan 42. An overall gear ratio of the geared architecture 48 between the fan 42 and the low pressure turbine 46 is between about 6:1 and 25:1. Traditional star or planet gear systems are unable to achieve this high of a gear ratio because of the relative size of the components in the gear system and the packaging constraints on the gas turbine engine 20.

The low pressure turbine 46 has a pressure ratio that is greater than about five. In one disclosed embodiment, the engine 20 bypass ratio is greater than about fifteen (15:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train or other gear system with a gear reduction ratio between about 6:1 and 25:1. It should be understood, however, that the above parameters are only exemplary of one non-limiting embodiment of a geared architecture engine 48 and that the present invention is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
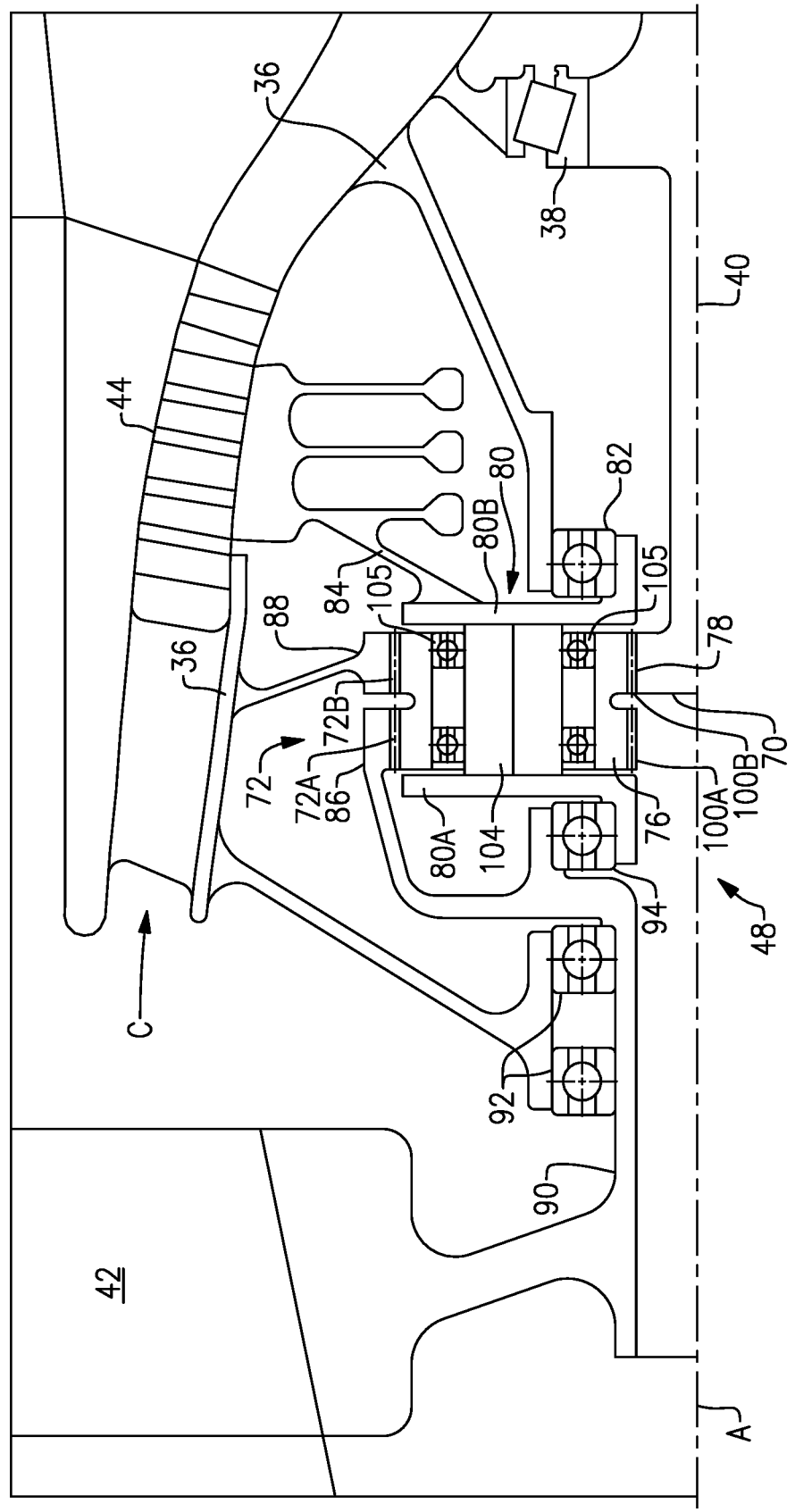
FIG. 2 is an enlarged view of a speed reduction device.

FIG. 2 is an enlarged view of the geared architecture 48. In one embodiment, the geared architecture 48 includes a sun gear 70, a split ring gear 72 disposed about the sun gear 70, and a plurality of intermediate gears 76 positioned between the sun gear 70 and the split ring gear 72. A carrier 80 supports the plurality of intermediate gears 76.

The sun gear 70 receives an input driving force from the low pressure turbine 46 through the inner shaft 40. The sun gear 70 includes a single set of teeth 78 that are axially with each other relative to the engine axis A. The teeth 78 may be transverse to the engine axis A or parallel to the engine axis A such that the teeth 78 are in meshing engagement and correspond to teeth on the intermediate gears 76.

The carrier 80 and the inner shaft 40 rotate in the same rotational direction as the low pressure turbine 46 and the sun gear 70. The carrier 80 supports the intermediate gears 76 and allows the intermediate gears 76 to rotate about the sun gear 70 and about an axis through shafts 104. In one non-limiting embodiment, the shafts 104 are solid shafts and in another non-limiting embodiment, the shafts 104 are hollow. Bearings 105, such as ball or roller bearings, are locating between the shafts 104 and the intermediate gears 76. In another example embodiment, the intermediate gears 76 are supported on journal bearings.

The carrier 80 includes an axially forward portion 80A and an axially aft portion 80B that form halves of the carrier 80. The plurality of intermediate gears 76 are located axially between the forward portion 80A and the aft portion 80B. The shafts 104 extend between the forward portion 80A and the aft portion 80B. The shafts 104 may be fixedly or removably attached to one or both of the forward portion 80A or the aft portion 80B.

The aft portion 80B of the carrier 80 is supported by a bearing system 82 attached to the engine static structure 36. The bearing system 82 allows the carrier 80 to rotate relative to the engine static structure 36. The carrier 80 drives the low pressure compressor 44 in the same direction as the low pressure turbine 46, the inner shaft 40, and the sun gear 70. In the illustrated example, the bearing system 82 is attached to a radially inner portion of the carrier 80 to avoid interfering with the carrier's ability to drive the low pressure compressor 44. A mechanical connection 84, such as a radially and axially extending arm, is located between the carrier 80 and the low pressure compressor 44 to transfer the rotational force form the carrier 80 to the low pressure compressor 44. The mechanical connection 84 is located radially outward from the bearing system 82.

The split ring gear 72 includes a forward portion 86 and an aft portion 88 located radially outward from the intermediate gears 76 and axially between the forward portion 80A and the aft portion 80B of the carrier 80. The forward portion 86 and the aft portion 88 of the split ring gear 72 are configured to move independently of each other. In the illustrated embodiment, the aft portion 88 is rigidly fixed from rotation relative to the engine static structure 36. The aft portion 88 also includes an aft set of teeth 72B. The aft set of teeth 72B may be transverse to the engine axis A or parallel to the engine axis A such that the aft set of teeth 72B are in meshing engagement with and correspond to teeth on the intermediate gears 76.

The forward portion 86 of the split ring gear 72 is attached to a fan drive shaft 90 that drives the fan 42. The fan drive shaft 90 rotates in an opposite rotational direction from the carrier 80, the sun gear 70, the inner shaft 40, and the low pressure turbine 46. The fan drive shaft 90 is supported by a pair of bearings 92, such as at least one of a roller bearing, taper bearing, thrust bearing, or another type of bearing. The fan drive shaft 90 also supports the forward portion 80A of the carrier 80 with a second bearing system 94. A radially inner portion of the second bearing system 94 supports the forward portion 80A of the carrier 80 and a radially outer portion of the second bearing system 94 is supported by the fan drive shaft 90. In the illustrated embodiment, the pair of bearings 92 supporting the fan drive shaft 90 are located on an opposite side of the fan drive shaft 90 from the second bearing system 94.

The forward portion 86 also includes a forward set of teeth 72A. The forward set of teeth 72A may be transverse to the engine axis A or parallel to the engine axis A such that the teeth 72A are in meshing engagement with and correspond to teeth on the intermediate gears 76. In one example embodiment, the forward and aft sets of teeth 72A, 72B are oriented in a herringbone pattern.

The intermediate gears 76 include a forward set of teeth 100A and an aft set of teeth 100B. The forward and aft sets of teeth 100A, 100B may be transverse to the engine axis A or parallel to the engine axis A such that the sets of teeth 100A, 100B are in meshing engagement with and correspond to forward and aft set of teeth 72A, 72B on the split ring gear 72. In one example embodiment, the forward and aft set of teeth 100A, 100B are oriented in a herringbone pattern that corresponds to the herringbone pattern of the forward and aft set of teeth 72A, 72B.

In the illustrated example, the aft set of teeth 100B are in meshing engagement with the teeth 78 on the sun gear 70 and the aft set of teeth 72B on the aft portion 88 of the split ring gear 72. The forward set of teeth 100A on the intermediate gears 76 are in meshing engagement with the forward set of teeth 72A on the forward portion 86 of the split ring gear 72.

The gear ratio (RR) between the fan 42 and the low pressure turbine 46 is determined by Equation (1) shown below.

$$RR = \frac{1 + \left(\frac{C}{A}\right)}{1 - \left(\frac{C}{B} \times \frac{D}{E}\right)}$$

Equation (1)

In the above Equation (1), A is the number of teeth 78 on the sun gear, B is the number of teeth 100B on the intermediate gears 76, C is the number of teeth 72B on the aft portion 88 of the split ring gear 72 fixed to the engine static structure 36, D is the number of teeth 100A on the forward set of teeth 100 on the intermediate gears 76, and E is the number of teeth 72A on the forward portion 86 of the split ring gear 72 connected to the fan drive shaft 90. In one example, A equals 33 teeth, B equals 33 teeth, C equals 99 teeth, and E equals 63 teeth. This example produces a gear ratio of 4:1 between the inner shaft 40 and the carrier 80, a gear ratio of 3.5:1 between the fan 42 and the carrier 80, and an overall gear ratio (RR) of 14:1. The gear ratio between the inner shaft 40 and the carrier 80 is represented by the numerator of Equation 1. The gear ratio between the fan 42 and the carrier 80 is determined by dividing the value in the numerator of Equation 1 by the reduction ratio (RR). A corresponding set of operating conditions might include the low pressure turbine rotating at 28,000 rpm, the low pressure compressor 44 rotating at 7,000 rpm, and the fan 42 rotating at 2,000 rpm.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

The invention claimed is:

1. A speed change device comprising:
    a sun gear;
    a plurality of intermediate gears surrounding the sun gear, each of the plurality of intermediate gears includes a forward set of teeth and an aft set of teeth;
    a ring gear surrounding the plurality of intermediate gears, the ring gear includes a forward portion with a forward set of teeth in meshing engagement with the forward set of teeth on each of the plurality of intermediate gears and an aft portion with an aft set of teeth in meshing engagement with the aft set of teeth on each of the plurality of intermediate gears, wherein the forward portion of the ring gear is configured to move independently of the aft portion of the ring gear and the forward portion of the ring gear is attached to a fan drive shaft; and
    a carrier including a carrier forward portion and a carrier aft portion, wherein each of the plurality of intermediate gears are located axially between the carrier forward portion and the carrier aft portion.

2. The speed change device of claim 1, wherein the carrier forward portion includes a forward projection, the fan drive shaft includes an aft projection, and a forward gear support bearing includes an inner race configured to rotate with the forward projection on the carrier forward portion and an outer race configured to rotate with the aft projection on the fan drive shaft.

3. The speed change device of claim 2, wherein the carrier aft portion include an aft projection in engagement with an inner race on an aft gear support bearing and an outer race of the aft gear support bearing is fixed relative to a static structure.

4. The speed change device of claim 1, wherein, the forward set of teeth of the intermediate gears are in meshing engagement with the ring gear for driving the fan drive shaft and the aft set of teeth of the intermediate gears are in meshing engagement with the sun gear.

5. The speed change device of claim 1, wherein the aft set of teeth on each of the plurality of intermediate gears are in meshing engagement with teeth of the sun gear.

6. The speed change device of claim 5, wherein the carrier aft portion includes a mechanical connection for driving a low pressure compressor.

7. The speed change device of claim 1, wherein each of the plurality of intermediate gears are supported by at least one bearing attached to a respective shaft, each shaft is supported by the carrier forward portion and the carrier aft portion, and the plurality of intermediate gears are located between the carrier forward portion and the carrier aft portion.

8. The speed change device of claim 1, wherein the aft portion of the ring gear is fixed relative to a static structure.

9. The speed change device of claim 1, wherein the sun gear is located aft of the forward set of teeth on the plurality of intermediate gears.

10. The speed change device of claim 1, wherein the forward set of teeth on the plurality of intermediate gears are fixed relative to the aft set of teeth on the plurality of intermediate gears.

11. The speed change device of claim 1, wherein the forward set of teeth on the plurality of intermediate gears include a first number of teeth and the aft set of teeth on the plurality of intermediate gears include a second number of teeth, the first number of teeth is different from the second number of teeth.

12. The speed change device of claim 11, wherein the forward set of teeth on the plurality of intermediate gears are fixed relative to the aft set of teeth on the plurality of intermediate gears.

13. The speed change device of claim 1, wherein the sun gear is configured to rotate in a first rotational direction and the fan drive shaft is configured to rotate in a second rotational direction opposite the first rotational direction.

14. The speed change device of claim 1, wherein the carrier is configured to rotate at a first rotational speed and the forward portion of the ring gear is configured to rotate at a second rotational speed less than the first rotational speed.

15. The speed change device of claim 1, wherein the sun gear and the carrier rotate in a first rotational direction and the forward portion of the ring gear rotates in a second rotational direction opposite the first rotational direction.

* * * * *